(No Model.)
W. W. POPE.
VESSEL FOR CONTAINING GAS UNDER PRESSURE.
No. 526,257. Patented Sept. 18, 1894.
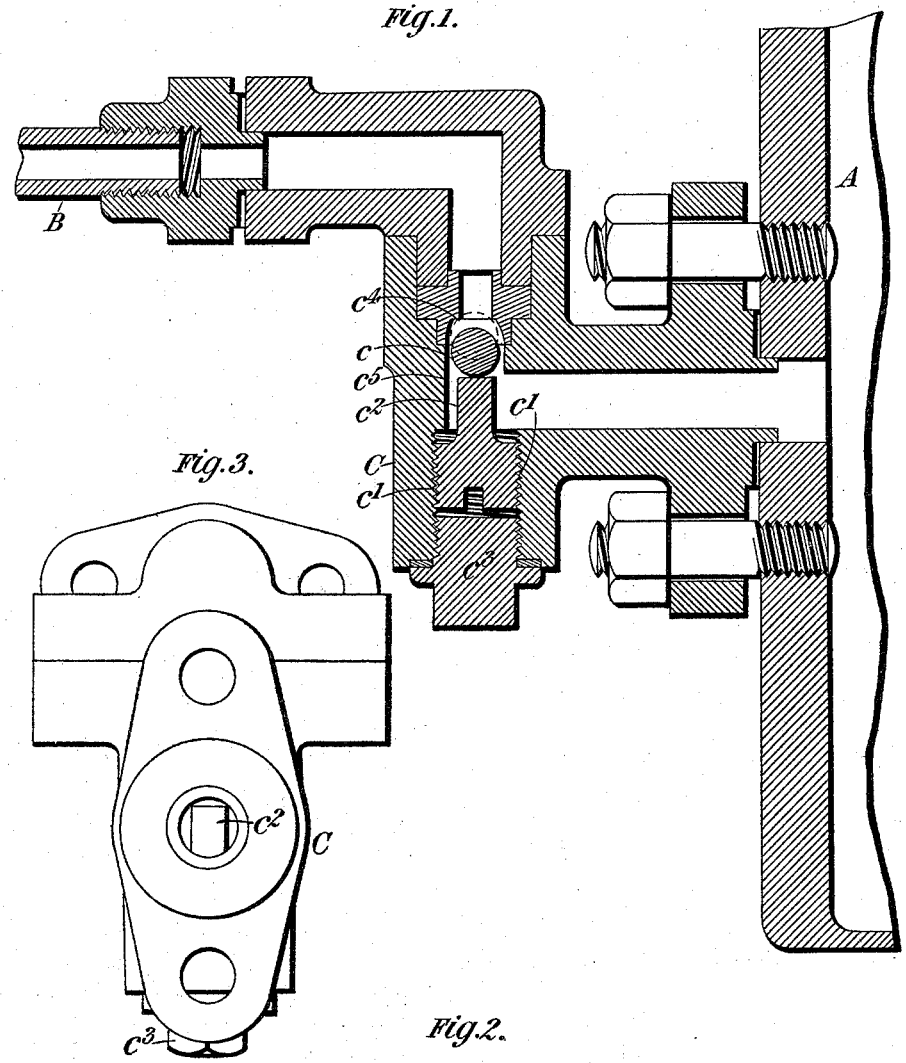
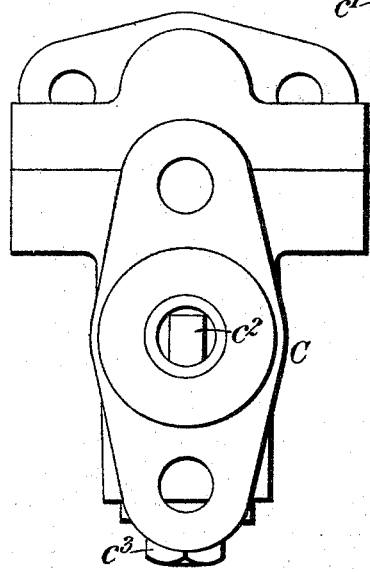
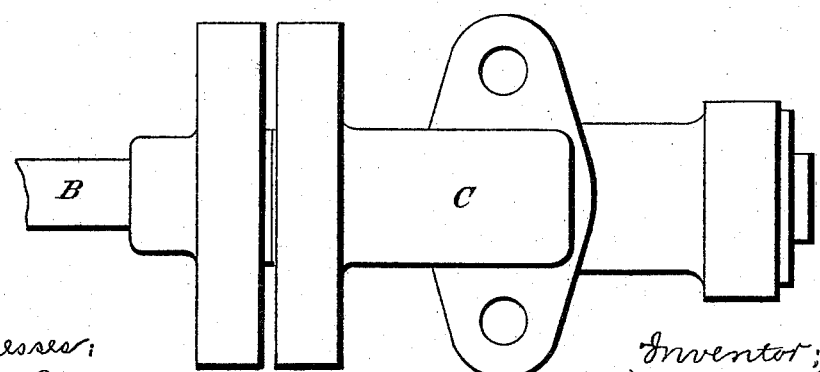
Witnesses:
G. W. Rea.
Thm. A. Greens
Inventor:
William W. Pope,
By James L. Norris,
Atty.

United States Patent Office.

WILLIAM WALLER POPE, OF SLOUGH, ENGLAND.

VESSEL FOR CONTAINING GAS UNDER PRESSURE.

SPECIFICATION forming part of Letters Patent No. 526,257, dated September 18, 1894.

Application filed June 30, 1894. Serial No. 516,218. (No model.)

*To all whom it may concern:*

Be it known that I, WILLIAM WALLER POPE, engineer, a subject of the Queen of Great Britain, residing at Gotha Iron Works, Slough, in the county of Bucks, England, have invented certain new and useful Improvements Relating to Vessels for Containing Gas under Pressure, of which the following is a specification, reference being had to the accompanying drawings.

My invention relates to vessels for containing gas under pressure, and has for its object to construct for such vessels an improved automatic valve adapted to be placed in the outlet passage therefrom. The said automatic valve is so arranged that it will permit the flow of gas through the said passage at such speeds as it would possess under normal conditions of working, but will close the passage in the event of the rate of exit of the gas being suddenly increased, as, for instance, by the breakage of the pipe through which the gas travels immediately after passing the valve, by serious leakage at the joints of the same, or by any other cause.

In the accompanying drawings, I have illustrated my invention.

Figure 1 is a vertical section of the end of the gas cylinder, pipe connection and valve. Fig. 2 is a plan of the pipe connection and valve, and Fig. 3 is an end elevation of the same.

A is the gas cylinder. B is the outlet pipe. C is a valve between said outlet pipe and the cylinder. I prefer to use a ball $c$ for the valve proper which ball is introduced through an opening $c'$ in the valve casing and is supported by an adjustable screw plug $c^2$. A plug $c^3$ is provided to close the opening $c'$ and prevent leakage of gas thereat, the said plug being flanged and packed as shown. $c^4$ is the valve seat above the valve. The valve is thus arranged to normally leave the passage through the seat open, and to rest in a part $c^5$ of the passage through which the gas flows toward the seating, and in suitable contiguity to the seat. The valve and the said part $c^5$ of the passage are so proportioned, relatively to each other that the cross-sectional area of passage available for the flow of gas past the valve is less than the cross-sectional area of the passage through the seating.

The support $c^2$ may be readily adjusted at any time by removing the plug $c^3$ and then turning the plug $c^2$ in the proper direction. By this means the distance from the seating at which the valve rests may be adjusted to suit requirements.

As long as the ordinary efflux of gas is not exceeded, the valve remains upon its support and away from the seating, but immediately upon the occurrence of any improper increase of flow of gas the valve will by the rush of gas be forced against the seating and will close the passage to the outlet pipe B. The passage will remain closed until the pressure within the pipe B approximates to that existing in the vessel A whereupon the valve will fall away from its seat and will resume its former position on the support $c^2$.

What I claim is—

1. The combination with the gas vessel A and its outlet pipe B, of the valve casing C intermediate said vessel and pipe and having a valve chamber $c^5$ provided at the top with a valve seat $c^4$, the ball valve $c$ supported just below said valve seat, and the supporting screw plug $c^2$ vertically adjustable below the said valve, substantially as and for the purpose shown and described.

2. The combination with the gas vessel A and its outlet pipe B, of the valve casing C having a valve chamber $c^5$ intermediate said vessel and pipe and provided at the top with the valve seat $c^4$, the ball valve $c$ supported just below said valve seat, the supporting screw plug $c^2$ inserted vertically into the lower end of the valve chamber below the said valve and adjustable to vary the distance of the valve from its seat, and the screw plug $c^3$ for closing the opening in the lower end of the valve casing below the adjustable valve supporting plug, substantially as and for the purpose shown and described.

In testimony whereof I have hereunto set my hand this 1st day of June, 1894.

WILLIAM WALLER POPE.

Witnesses:
   JOHN BROWN,
      *Clerk, Stoke Road, Slough.*
   JOHN FLEWELLING,
      *Clerk, Wellington Street, Slough.*